United States Patent Office 2,849,374
Patented Aug. 26, 1958

2,849,374

PROCESS FOR REMOVING MERCAPTAN SULFUR WITH HYDROGEN FLUORIDE IN THE PRESENCE OF A SATURATED HYDRO-CARBYL MONO KETONE

Johann Heinrich Friedrich Diederich Schmidt, Amsterdam, Netherlands, assignor to Shell Development Company, New York, N. Y., a corporation of Delaware No Drawing. Application July 27, 1955
Serial No. 524,808

Claims priority, application Netherlands August 20, 1954

4 Claims. (Cl. 196—31)

This invention relates to the treatment of hydrocarbon oils and particularly to a process for the removal of sulfur compounds therefrom.

It is known to treat hydrocarbon oils with hydrogen fluoride in order to remove sulfur compounds therefrom. In this treatment some of the sulfur compounds are partly extracted as such, and some of the sulfur compounds originally present are first partly converted into other sulfur compounds which are afterwards extracted. There is, however, a considerable difference between the various types of sulfur compounds with respect to the degree to which they can be removed by treating the hydrocarbon oil with hydrogen fluoride. Thioethers are generally very easily extracted by means of hydrogen fluoride, while mercaptans, particularly the higher primary mercaptans, are usually removed only very incompletely under conditions which are suitable in practice for treating with hydrogen fluoride.

It is a principal object of the present invention to provide an improved method of treating a hydrocarbon oil for the removal of sulfur therefrom. It is a further object of the invention to provide an improved process of hydrogen fluoride extraction of a mineral oil. Another object is to increase the removal of sulfur compounds from hydrocarbon oils in an extraction process utilizing liquid hydrogen fluoride as the extractant. Still another object is to provide an improved process of removing mercaptan sulfur from a mineral oil by means of extracting the oil with liquid hydrogen fluoride.

It has now been found that the removal of mercaptans from hydrocarbon oils by extraction with liquid hydrogen fluoride is greatly promoted by carrying out this extraction in the presence of a small quantity of a saturated hydrocarbyl ketone, i. e., an alkanone, including cycloalkanones, containing from 3 to 8 carbon atoms.

A complete or practically complete removal of the mercaptans is obtained if at least one mol of ketone is present per gram atom of mercaptan sulfur. In the present process the ketone is therefore preferably used in a quantity of at least one mol per gram atom of mercaptan sulfur present in the hydrocarbon oil to be treated. If desired, a larger amount of ketone may also be applied, for example, up to 10 or even 20 mols of ketone per gram atom of the mercaptan sulfur present, although this is usually not necessary in order to bring about a substantially complete removal of the mercaptans. Concentrations of from 1 to 5 mols of ketone per gram atom of mercaptan sulfur present are preferred.

The present process is limited to the use of saturated ketones since the use of unsaturated compounds has various disadvantages. Hydrogen fluoride is effective as a polymerization and condensation catalyst with respect to unsaturated compounds, so that higher molecular products are formed therefrom which are particularly undesirable in lighter hydrocarbon oils. In gasoline the gum content is increased to an undesirable extent by the formation of polymerization and condensation products. In kerosene the formation of these products has an unfavorable effect on the combustion properties, resulting in, for example, a more pronounced crust formation on the wick of the combustion apparatus. Another reason that saturated ketones should be used in the process is that unsaturated compounds and hydrogen fluoride may form addition products which are to some extent soluble in hydrocarbon oils and are of course highly undesirable therein because of corrosion and other deleterious effects.

The treatment of the hydrocarbon oil with hydrogen fluoride in the presence of a ketone is preferably carried out in the liquid phase so that the conversion of the mercaptans and the extraction of the compounds formed therefrom, probably thioacetals, will occur simultaneously. In this treatment the hydrocarbon oil is kept in intimate contact with the hydrogen fluoride phase in the presence of the ketone. In treating light hydrocarbons it is possible, however, to carry out the conversion of the mercaptans in the gas phase, in which case a low molecular weight ketone will be preferred, such as acetone and methyl ethyl ketone. After this, the compounds formed from the mercaptans can be extracted by means of liquid hydrogen fluoride.

The process may be carried out either continuously or batchwise.

A suitable manner of carrying out the process batchwise comprises stirring the hydrocarbon oil vigorously with liquid hydrogen fluoride in the presence of a ketone during the period required for the reaction and extraction, after which the mixture is allowed to stand. The mixture then separates into two liquid phases, hydrogen fluoride on the bottom and hydrocarbon oil on the top. The two layers can be separated from each other by the usual methods, for example by decanting or centrifuging.

The process is carried out continuously in the manner of any conventional continuous liquid-liquid contacting process, preferably with countercurrent flow of the hydrocarbon oil and the hydrogen fluoride, for example in a packed column, rotating disk contactor, or the like.

The treatment can be carried out at usual extraction temperatures. In view of the boiling point of hydrogen fluoride (19.5° C.) it is generally advisable that the temperature of the treatment should not be over 100° C. since otherwise a considerable pressure is required for operating in the liquid phase. Moreover, the extractive capacity of hydrogen fluoride decreases at increased temperature. Preferably the treatment will be carried out at temperatures no greater than 40° C. Also, to avoid excessive refrigeration costs it is preferred that the process temperature be no lower than 0° C., or especially, no lower than 20° C.

The duration of the treatment, that is, the contact time, depends on the nature of the hydrocarbon oil, especially the quantity and nature of the mercaptans and other sulfur compounds present therein, the amount of hydrogen fluoride and the temperature. Consequently, the duration may vary from a few minutes to several hours. In many cases the treatment may be carried out in a period of from 10 to 60 minutes.

The ratio of the amount of hydrogen fluoride to the amount of the hydrocarbon oil to be treated may vary within relatively wide limits. The quantity of hydrogen fluoride preferably used depends on the nature and quantity of the mercaptans and other sulfur compounds present in the oil and the temperature at which the treatment is carried out. Generally, the volumetric ratio of hydrogen fluoride used to the hydrocarbon oil treated will be at least 0.05:1 and especially at least 0.1:1. On the other hand this ratio will generally be no greater than 1:1, and usually no greater than 0.3:1.

The ketones which can be used in the process of the invention are the saturated (i. e., containing no carbon-to-carbon unsaturated bonds of either aromatic or non-aromatic character) hydrocarbyl mono-ketones containing from 3 through 8 carbon atoms per molecule and preferably from 3 through 5 carbon atoms per molecule. Ketones of this broad class do not enolize to any appreciable extent. The preferred class of such ketones are the aliphatic (i. e., non-cyclic) ketones, especially acetone and butanone. However, saturated cyclic ketones, for example cyclohexanone, are also suitable. If desired, mixtures of ketones can be used, and in some cases will be advantageous.

Examples of suitable ketones are: acetone, 2-butanone, 2-pentanone, 3-methyl-2-butanone, 3-pentanone, 2-hexanone, 3-methyl-2-pentanone, 3,3-dimethyl-2-butanone, 3-hexanone, 2-methyl-3-pentanone, 2-heptanone, 3-ethyl-2-pentanone, 4,4-dimethyl-2-pentanone, 4-methyl-3-hexanone, 4-heptanone, 2-methyl-3-hexanone, 2-octanone, 4-ethyl-2-hexanone, 4,4-dimethyl-2-hexanone, 4-methyl-3-heptanone, 2,2-dimethyl-3-hexanone, 2,2,4-trimethyl-3-pentanone, cyclopentanone, 3-methylcyclopentanone, 3-isopropylcyclopentanone, cyclohexanone, 3-methylcyclohexanone, 2-ethylcyclohexanone, and 2,4-dimethylcyclohexanone.

The ketone may be added to the hydrocarbon oil before the latter comes into contact with the hydrogen fluoride. If desired, however, the ketone may also be added after the hydrocarbon oil has been contacted with the hydrogen fluoride.

In order to increase the extractive capacity of the hydrogen fluoride, boron trifluoride may be dissolved therein in a manner already known (see U. S. 2,343,841). The quantity of boron trifluoride with respect to the quantity of hydrogen fluoride may vary within wide limits, for example from traces, e. g. 0.1 mol percent, up to 50 mol percent, based on the amount of hydrogen fluoride.

After the hydrocarbon oil and the hydrogen fluoride phase have been separated from each other, any amount of hydrogen fluoride and any boron trifluoride still remaining in the hydrocarbon oil may be removed in any conventional way, for example, by distillation, if desired under reduced pressure. The removal of the small amount of hydrogen fluoride remaining behind in the hydrocarbon oil after the phase separation may in many cases be promoted by adding to the hydrocarbon oil a small amount of a light hydrocarbon, such as propane or pentane, which distills from the oil together with the hydrogen fluoride in the form of an azeotropic mixture when the pressure is reduced or the temperature increased.

The hydrogen fluoride remaining behind in the hydrocarbon oil can also be removed by washing the oil with water, to which, if desired, an alkaline substance, such as an alkali metal hydroxide or carbonate, or ammonium hydroxide, may be added.

The present process is especially suitable for removing sulfur compounds, at least some of which are formed from mercaptans, from hydrocarbon oils containing no, or practically no, unsaturated components, particularly hydrocarbon oils with a content of unsaturated components of less than 0.1% by weight and preferably less than 0.05% by weight. In this connection the process is particularly suitable for the so-called straight-run distillates, that is, the hydrocarbon oils obtained by straight distillation of a crude oil. The process is particularly applicable to the lighter hydrocarbon oils such as gasoline, kerosene and gas oil, that is, straight-run petroleum distillates boiling within the range of 10° to 400° C., or especially, over a range of from 40° to 350° C. However, the process may also be used for removing mercaptans and other sulfur compounds from heavier hydrocarbon oils such as lubricating oils.

The presence of water should be avoided as far as possible. Consequently, hydrogen fluoride is used which contains less than 5% by weight of water, and is preferably anhydrous.

The process will be illustrated by the following examples, which show preferred embodiments of the invention but are not to be considered limitations thereon.

EXAMPLE I

A straight-run kerosene obtained from Kirkuk crude oil and having a mercaptan sulfur content of 0.0350% by weight, a disulfide sulfur content of 0.0010% by weight, and a total sulfur content of 0.27% by weight, was treated with hydrogen fluoride in the presence of acetone. A number of comparative tests were carried out, the amount of acetone being varied with respect to the mercaptan sulfur content. In Table I, which shows the results of the tests carried out, the amount of acetone is expressed by the number of mols used per gram atom of mercaptan sulfur in the kerosene (shown as mols of acetone/gram atom of mercaptan sulfur). At the same time the amount of acetone is shown as a percentage by weight added to the kerosene. The remaining data in Table I are self-explanatory.

*Table I*

| Run No. | 1 | 2 | 3 | 4 | 5 | 6 | 7 | 8 | 9 |
|---|---|---|---|---|---|---|---|---|---|
| Dosage of HF, percent by weight, based on kerosene | 10.4 | 10.1 | 14.7 | 13.6 | 11.7 | 11.8 | 13.3 | 10.9 | 13.0 |
| Dosage of acetone, percent by weight, based on kerosene | None | None | 0.48 | 0.48 | 0.24 | 0.08 | 0.04 | 0.04 | 0.04 |
| Mols of acetone per gram atom of mercaptan sulfur | | | 7.60 | 7.60 | 3.80 | 1.26 | 0.63 | 0.63 | 0.63 |
| Contact time in minutes | 10 | 60 | 10 | 60 | 10 | 10 | 10 | 60 | 10 |
| Contact temperature, °C | 20 | 20 | 20 | 20 | 20 | 20 | 20 | 20 | 30 |
| Amount of refined oil recovered as percent by weight of starting oil treated | 96.5 | 96.6 | 96.8 | 95.1 | 96.8 | 96.5 | 96.3 | 95.5 | 97.0 |
| Mercaptan sulfur content of refined oil, percent by weight | 0.0152 | 0.0170 | 0.0004 | 0.0003 | 0.0004 | 0.0004 | 0.0041 | 0.0024 | 0.0034 |
| Disulfide sulfur content of refined oil, percent by weight | 0.0061 | 0.0025 | 0.0006 | 0.0001 | 0.0005 | 0.0010 | 0.0038 | 0.0055 | 0.0060 |
| Total sulfur content of refined oil, percent by weight | 0.062 | 0.05 | 0.044 | 0.030 | 0.044 | 0.048 | 0.044 | 0.047 | 0.052 |
| Percentage of mercaptan sulfur and disulfide sulfur removed | 40.8 | 45.8 | 97.2 | 98.9 | 97.5 | 96.1 | 78.0 | 78.0 | 74.0 |
| Percentage of total sulfur content removed | 77.0 | 81.5 | 83.7 | 88.9 | 83.7 | 82.2 | 83.7 | 82.6 | 80.7 |

The results of Runs 3, 4, 5 and 6, in which more than 1 mol of acetone was used per gram atom of mercaptan sulfur originally present, show that by the simultaneous use of acetone a substantially complete removal of the mercaptan sulfur is obtained, so that the hydrocarbon oil treated reacts negatively to the "doctor test." Furthermore, a comparison of the results of Runs 7, 8 and 9, carried out with an underdose of acetone, with the results of Runs 1 and 2, carried out without acetone, shows that a considerably better removal of mercaptans is obtained even when using an underdose of acetone than in the absence of acetone. However, the hydrocarbon oil treated in Runs 7, 8 and 9 still reacted positively to the "doctor test."

EXAMPLE II

A straight-run kerosene obtained from Kirkuk crude oil and which was free from disulfides, but which had a mercaptan sulfur content of 0.0120% by weight and a total surfur content of 0.34% by weight, was vigorously stirred with 16.3% by weight of hydrogen fluoride for 10 minutes at a temperature of 20° C., after addition of 0.02% by weight of acetone. The amount of 0.02% by weight of acetone corresponds to 1.00 mol per gram atom of the mercaptan sulfur present in the kerosene.

After this treatment the mixture was allowed to stand for 60 minutes, after which the hydrocarbon oil was separated from the hydrogen fluoride layer.

In this way a kerosene was obtained in a yield of 96.8%, based on the starting kerosene, having 0.0005% by weight of mercaptan sulfur, 0.005% by weight of sulfur bound in the form of disulfides, and a total sulfur content of 0.067% by weight.

EXAMPLE III

This example illustrates the fact that lower saturated hydrocarbyl ketones greatly promote the removal of mercaptans from a hydrocarbon oil in treating with hydrogen fluoride, whereas somewhat similar compounds, e. g., aldehydes and alcohols, do not have such an effect or have it only to a much smaller degree.

The kerosene used for the tests of this example was the same as in Example I. The results of the tests are shown in Table II, which is arranged in the same way as Table I.

EXAMPLE V

Results substantially the same as those of Example IV are obtained when, instead of 3,3-dimethyl-2-butanone, any one of the following ketones are used, at a concentration of at least 1.0 mol of the ketone per gram atom of mercaptan sulfur in the gasoline: acetone, 2-butanone, 2-pentanone, 3-methyl-2-butanone, 3-pentanone, 2-hexanone, 3-heptanone, cyclohexanone and 2,6-dimethylcyclohexanone.

I claim as my invention:

1. A process for the removal of mercaptan sulfur from an essentially saturated mercaptan-containing hydrocarbon oil, which comprises the steps of contacting the oil with liquid hydrogen fluoride in a ratio of from about 0.05 to about 1 volume of a liquid hydrogen fluoride per volume of the oil in the presence of from about 1 to about 20 gram mols, per gram atom of mercaptan sulfur present in the hydrocarbon oil, of a saturated hydrocarbyl mono-ketone having from 3 through 8 carbon atoms per molecule, separating the oil from the hydrogen fluoride and recovering an oil product of reduced mercaptan sulfur content.

2. A process in accordance with claim 1 wherein the ketone is an aliphatic ketone containing from 3 through 5 carbon atoms per molecule.

*Table II*

| Run No. | 1 | 2 | 3 | 4 | 5 |
| --- | --- | --- | --- | --- | --- |
| Dosage HF, percent by weight, based on kerosene | 10.4 | 11.8 | 12.3 | 12.7 | 11.9. |
| Substance added to hydrocarbon oil | None | Acetone | 2-butanone (methyl ethyl ketone). | Ethanol | Acetaldehyde. |
| Dosage of substance added, percent by weight, based on kerosene. |  | 0.08 | 0.08 | 0.05 | 0.05. |
| Mols of substance added per gram atom of mercaptan sulfur |  | 1.26 | 1.07 | 1.00 | 1.00. |
| Contact time in minutes | 10 | 10 | 10 | 10 | 10. |
| Contact temperature, °C | 20 | 20 | 20 | 20 | 20. |
| Amount of refined oil recovered as percent by weight of starting oil treated. | 96.5 | 96.5 | 96.6 | 96.5 | 96.3. |
| Mercaptan sulfur content of refined oil, percent by weight | 0.0152 | 0.0004 | 0.0007 | 0.0106 | 0.0099. |
| Disulfide sulfur content of refined oil, percent by weight | 0.0061 | 0.0010 | 0.0017 | 0.0095 | 0.0074. |
| Total sulfur content of refined oil, percent by weight | 0.062 | 0.048 | 0.048 | 0.062 | 0.060. |
| Percentage of mercaptan sulfur and disulfide sulfur removed | 40.8 | 96.1 | 93.3 | 44.2 | 51.9. |
| Percentage of total sulfur content removed | 77.0 | 82.2 | 82.2 | 77.0 | 77.8. |

The results of Table II show a practically complete removal of the mercaptans in treating the kerosene with hydrogen fluoride in the presence of acetone or butanone (Runs 2 and 3). On the other hand the results obtained with ethanol (Run 4) and acetaldehyde (Run 5) are not much better than that obtained by treating the kerosene with hydrogen fluoride without any added substance (Run 1).

EXAMPLE IV

A straight-run gasoline distillate from West Texas crude had an API gravity of 57.4°, an initial A. S. T. M. boiling point of 77° C. and a final A. S. T. M. boiling point of 154° C., and contained 0.055% by weight mercaptan sulfur, essentially no sulfide sulfur and 0.140% by weight total sulfur. When this gasoline is contacted with about 8 percent by weight anhydrous hydrogen fluoride, based on the gasoline, for about 15 minutes, at a temperature of about 15° C., and the gasoline separated and recovered, some of the mercaptan sulfur is removed from the gasoline. However, when the same procedure is carried out, but in this case in the presence of 0.19% by weight of 3,3-dimethyl-2-butanone, based on the gasoline (about 1.1 mols of the ketone per gram atom of mercaptan sulfur in the gasoline), a greatly increased removal of mercaptan sulfur is achieved, up to an essentially complete removal, resulting in a "doctor sweet" gasoline product.

3. In a process for the removal of mercaptan sulfur from mercaptan-containing straight-run petroleum distillate boiling within the range of 10° C. to 400° C. by contacting the distillate with liquid hydrogen fluoride, separating the distillate from the hydrogen fluoride and recovering a distillate product of reduced mercaptan content, the improvement comprising increasing the removal of mercaptan sulfur by effecting the contacting of distillate and hydrogen fluoride in the presence of from about 1 to about 20 gram mols, per gram atom of mercaptan sulfur in the mercaptan-containing distillate, of a saturated hydrocarbyl mono-ketone having from 3 through 8 carbon atoms per molecule.

4. A process for the removal of mercaptan sulfur from a mercaptan-containing straight-run kerosene, which comprises the steps of contacting the kerosene with liquid hydrogen fluoride in a ratio of from about 0.1 to about 0.3 volume of liquid hydrogen fluoride per volume of the kerosene in the presence of from about 1 to about 10 gram mols of acetone per gram atom of mercaptan sulfur in the kerosene, separating the kerosene from the hydrogen fluoride and recovering a kerosene product of reduced sulfur content.

References Cited in the file of this patent

UNITED STATES PATENTS

| | | |
| --- | --- | --- |
| 2,564,071 | Lien et al. | Aug. 14, 1951 |
| 2,745,792 | Shiah | May 15, 1956 |